US010354201B1

(12) United States Patent
Roy et al.

(10) Patent No.: US 10,354,201 B1
(45) Date of Patent: Jul. 16, 2019

(54) SCALABLE CLUSTERING FOR MIXED MACHINE LEARNING DATA

(71) Applicant: Amazon Technologies, Inc., Seattle, WA (US)

(72) Inventors: Gourav Roy, Bangalore (IN); Amit Chandak, Bangalore (IN); Prateek Gupta, Bangalore (IN); Srujana Merugu, Bangalore (IN); Aswin Natarajan, Bangalore (IN); Sathish Kumar Palanisamy, Dharmapuri (IN); Gowda Dayananda Anjaneyapura Range, Redmond, WA (US); Jagannathan Srinivasan, Bangalore (IN); Bharath Venkatesh, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 724 days.

(21) Appl. No.: 14/990,171

(22) Filed: Jan. 7, 2016

(51) Int. Cl.
G06F 16/28 (2019.01)
G06N 20/00 (2019.01)

(52) U.S. Cl.
CPC .......... G06N 20/00 (2019.01); G06F 16/285 (2019.01)

(58) Field of Classification Search
USPC ........................................................ 706/12
See application file for complete search history.

(56) References Cited

U.S. PATENT DOCUMENTS 7,480,640 B1 * 1/2009 Elad ..................... G06Q 10/10
706/14
8,401,991 B2 * 3/2013 Wu .......................... G06F 16/20
707/602
8,606,761 B2 * 12/2013 Kenedy .................. G16H 50/30
707/688

(Continued)

FOREIGN PATENT DOCUMENTS

JP 2009282577 12/2009

OTHER PUBLICATIONS

ACM Digital Library Distributional clustering of words for text classification L. Douglas Baker,Andrew Kachites McCallum SIGIR '98 Proceedings of the 21st annual international ACM SIGIR conference on Research and development in information retrieval pp. 96-103 Melbourne, Australia—Aug. 24-28.*

(Continued)

Primary Examiner — Michael B Holmes
(74) Attorney, Agent, or Firm — Robert C. Kowert; Meyertons, Hood, Kivlin, Kowert & Goetzel, P.C.

(57) ABSTRACT

A number of attributes of different attribute types, to be used to assign observation records of a data set to clusters, are identified. Attribute-type-specific distance metrics for the attributes, which can be combined to obtain a normalized aggregated distance of an observation record from a cluster representative, are selected. One or more iterations of a selected clustering methodology are implemented on the data set using resources of a machine learning service until targeted termination criteria are met. A given iteration includes assigning the observations to clusters of a current (Continued)

version of a clustering model based on the aggregated distances from the cluster representatives of the current version, and updating the cluster representatives to generate a new version of the clustering model.

20 Claims, 12 Drawing Sheets

(56) References Cited

U.S. PATENT DOCUMENTS

| | | | | |
|---|---|---|---|---|
| 8,655,899 | B2* | 2/2014 | Kenedy | G16H 50/30 |
| | | | | 707/758 |
| 8,655,908 | B2* | 2/2014 | Kenedy | G16H 50/30 |
| | | | | 707/769 |
| 8,719,250 | B2* | 5/2014 | Chong | G06F 16/2455 |
| | | | | 707/713 |
| 8,788,283 | B2* | 7/2014 | Kenedy | G16H 50/30 |
| | | | | 705/2 |
| 9,098,566 | B2* | 8/2015 | Srinivasan | G06F 16/211 |
| 9,141,966 | B2* | 9/2015 | Merugu | G06Q 10/06 |
| 9,170,992 | B2* | 10/2015 | Kenedy | G16H 50/30 |
| 9,378,065 | B2* | 6/2016 | Shear | G06F 9/5072 |
| 9,710,568 | B2* | 7/2017 | Srinivasan | G06F 16/80 |
| 9,792,160 | B2* | 10/2017 | Shear | G06F 9/5072 |
| 9,904,579 | B2* | 2/2018 | Shear | G06F 9/50 |
| 10,073,892 | B1* | 9/2018 | Khare | G06F 16/26 |
| 10,089,675 | B1* | 10/2018 | Rastogi | G06F 7/60 |
| 10,157,351 | B1* | 12/2018 | Rastogi | G06N 7/005 |
| 2012/0191631 | A1 | 7/2012 | Breckenridge et al. | |
| 2014/0280952 | A1* | 9/2014 | Shear | H04L 47/70 |
| | | | | 709/226 |
| 2014/0282586 | A1* | 9/2014 | Shear | G06F 9/5072 |
| | | | | 718/104 |
| 2016/0034305 | A1* | 2/2016 | Shear | G06F 9/50 |
| | | | | 707/722 |
| 2016/0266939 | A1* | 9/2016 | Shear | G06F 9/5072 |

OTHER PUBLICATIONS

ACM Digital Library Entropy-based criterion in categorical clustering Tao Li University of Rochester, Sheng Ma IBM T. J. Watson Research Center, Mitsunori Ogihara University of Rochester, ICML '04 Proceedings of the twenty-first international conference on Machine Learning pp. 1-8 Banff, Alberta, Jul. 2004.*
Elsevier Pattern Recognition Letters vol. 31, Issue 8, Jun. 1, 2010, pp. 651-666 Data clustering: 50 years beyond K-means, Anil K. Jain, Department of Computer Science and Engineering, Michigan State University.*
Elsevier Artificial Intelligence in Medicine vol. 50, Issue 2, Oct. 2010, pp. 105-115 Missing data imputation using statistical and machine learning methods in a real breast cancer problem José M. Jerez, Ignacio Molina, Pedro J. García-Laencina, Emilio Alba,Nuria Ribelles,Miguel Martín e,Leonardo Franco.*
ScienceDirect Elsevier Data & Knowledge Engineering vol. 63, Issue 2, Nov. 2007, pp. 503-527 A k-mean clustering algorithm for mixed numeric and categorical data , Amir Ahmad, Lipika Dey.*
SpringerLink Grouping Multidimensional Data pp. 25-71 A Survey of Clustering Data Mining Techniques P. Berkhin 2006.*
SpringerLink Data Mining and Knowledge Discovery Handbook pp. 321-352 Clustering Methods Lior Rokach, Oded Maimon 2005.*
SpringerLink Knowledge and Information Systems Aug. 2010, vol. 24, Issue 2, pp. 171-196 On clustering massive text and categorical data streams Charu C. AggarwalEmail author, Philip S. Yu.*
U.S. Appl. No. 14/990,161, filed Jan. 7, 2016, Gourav Roy et al.
"Poll: Which methods/algorithms did you use for data analysis in 2011?", Retrieved from http://www.kdnuggets.com/polls/2011/algorithms-analytics-data-mining.html, Downloaded on Oct. 26, 2015, pp. 1-3.

Xindong Wu, et al., "Top 10 Algorithms in data mining", Springer-Verlag, Dec. 4, 2007, pp. 1-37.
"Large Scale Machine Learning and Other Animals: What are the most widely deployed machine learning algorithms?", Retrieved from http://bickson.blogspot.ie/2011/06/what-are-most-widely-deployed-machine.html?spref=tw, Downloaded Oct. 26, 2015, pp. 1-5.
Pavel Berkhin, "Survey of Clustering Data Mining Techniques", Grouping Multidimensional Data, Springer Berlin Heidelberg, 2006, pp. 25-71.
Rui Xu, et al., "Survey of clustering algorithms", IEEE Transactions on Neural Networks, vol. 16, No. 3, May 2005, pp. 645-678.
Charu C. Aggarwal, et al., "A Survey of Text Clustering Algorithms", Mining Text Data, Springer, 2012, pp. 77-128.
"Largest Dataset Analyzed/Data Mined", Retrieved from http://www.kdnuggets.com/polls/2014/largest-dataset-analyzed-data-mined-2014.html, Downloaded Oct. 26, 2015, pp. 1-2.
Charles Elkan, "Using the Triangle Inequality to Accelerate k-Means", ICML, vol. 3, 2003, pp. 147-153.
D. Sculley, "Web-Scale K-Means Clustering", Proceedings of the 19th International Conference on World Wide Web, ACM, 2010, pp. 1177-1178.
Inderjit S. Dhillon, et al., "A Divisive Information-Theoretic Feature Clustering Algorithm for Text Classification", Journal of Machine Learning Research 3, 2003. pp. 1265-1287.
Inderjit S. Dhillon, et al., "Concept Decompositions for Large Sparse Text Data using Clustering", Machine Learning 42, 2001, pp. 143-175.
Inderjit S. Dhillon, et al., "Kernel k-means, Spectral Clustering and Normalized Cuts", Proceeding of the Tenth ACM SIGKDD International Conference on Knowledge Discovery and Data Mining, ACM, 2004, pp. 551-556.
Dharmendra S. Modha, et al., "Feature Weighting in k-means Clustering", Machine Learning 52, No. 3, 2003, pp. 217-237.
Arindam Banerjee, et al., "Clustering with Bregman Divergences", Journal of Machine Learning Research 6, 2005, pp. 1705-1749.
Sugato Basu, et al., "Semi-supervised Clustering by Seeding", Proceeding of the 19th International Conference on Machine Learning (ICML-2002), Jul. 2002, pp. 19-26.
Nir Ailon, et al., "Streaming k-means approximation", Advances in Neural Information Processing Sysytems, 2009, pp. 10-18.
David Arthur, et al., "k-means++: The Advantages of Careful Seeding", Proceedings of the Eighteenth Annual ACM-SIAM Symposium on Discrete Algorithms, Society for Industrial and Applied Mathematics, Jan. 2007, pp. 1027-1035.
Sanjay Chawla, et al., "k-means—: A unified approach to clustering and outlier detection", In SDM, May 2013, pp. 189-197.
Charles Elkan, "Clustering with k-means: faster, smarter, cheaper", Keynote talk at Workshop on Clustering High-Dimensional Data, SIAM International Conference on Data Mining, Apr. 2004, pp. 1-38.
Inderjit S. Dhillon, et al., "Information Theoretic Clustering of Sparse Co-Occurrence Data", In Data Mining, Third IEEE International Conference (ICDM 2003), 2003, pp. 517-520.
"Gmeans: A clustering tool in ping-pong style", Retrieved from URL: http://www.cs.utexas.edu/users/dml/Software/gmeans.html, Download Oct. 26, 2015, pp. 1-5.
Y. Zhao, et al., "Criterion Functions for Clustering on High-Dimensional Data", In Group Multidimensional Data, Spring Berlin Heidelberg, 2006, pp. 211-237.
Inderjit S. Dhillon, et al., "Information-Theoretic Co-clustering", Proceedings of the Ninth ACM SIGKDD International Conference on Knowledge Discovery and Data Mining, ACM, 2003, pp. 89-98.
Xiaohua Zhou, et al., "Semantic Smoothing of Document Models for Agglomerative Clustering", In IJCAI!, 2007, pp. 2928-2933.
Kurt Hornik, et al., "Spherical k-Means Clustering", Journal of Statistical Software, vol. 50, Issue 10, Sep. 2012, pp. 1-22.
Robert Tibshirani, et al., "Estimating the number of clusters in a data set via the gap statistic", Journal of the Royal Statistical Society: Series B (Statistical Methodology, 2001, pp. 411-423.
Wikipedia, "Akaike information criterion", Retrieved from URL: http://en.wikipedia.org/wiki/Akaike_information_criterion, Downloaded Oct. 26, 2015, pp. 1-9.

(56) References Cited

OTHER PUBLICATIONS

"Amazon Machine Learning Developer Guide", Amazon Web Services, Apr. 19, 2015, pp. 1-128.
"Amazon Machine Learning API Reference", Amazon Web Services, Dec. 12, 2014, pp. 1-124.
Marcel R. Ackermann, et al., "Bregman Clustering for Separable Instances", In Algorithm Theory—SWAT 2010, Springer Berlin Heidelberg, 2010, pp. 21-223.
K. Kameshwaran, et al., "Survey on Clustering Techniques in Data Mining", International Journal of Computer Science and Information Technologies, vol. 5 (2), 2014, pp. 2272-2276.
U.S. Appl. No. 14/460,163, filed Aug. 14, 2014, Zuohua Zhang.
U.S. Appl. No. 14/489,448, filed Sep. 17, 2014, Leo Parker Dirac, et al.
U.S. Appl. No. 14/460,312, filed Aug. 14, 2014, Leo Parker Dirac, et al.
U.S. Appl. No. 14/318,880, filed Jun. 30, 2014, Leo Parker Dirac, et al.
U.S. Appl. No. 14/319,902, filed Jun. 30, 2014, Leo Parker Dirac, et al.
U.S. Appl. No. 14/460,314, filed Aug. 14, 2014, Leo Parker Dirac, et al.
U.S. Appl. No. 14/463,434, filed Aug. 19, 2014, Robert Matthias Steele, et al.
U.S. Appl. No. 14/569,458, filed Dec. 12, 2014, Leo Parker Dirac, et al.
U.S. Appl. No. 14/489,449, filed Sep. 17, 2014, Leo Parker Dirac, et al.
U.S. Appl. No. 14/484,201, filed Sep. 11, 2014, Michael Brueckner, et al.
U.S. Appl. No. 14/538,723, filed Nov. 11, 2014, Polly Po Yee Lee, et al.
U.S. Appl. No. 14/923,237, filed Oct. 26, 2015, Leo Parker Dirac, et al.
U.S. Appl. No. 14/935,426, filed Nov. 8, 2015, Gowda Dayananda Anjaneyapura Range, et al.

\* cited by examiner

| Observation record name 607 ↓ | Numeric | Numeric | Categorical | Text | ← Attribute type 603 |
|---|---|---|---|---|---|
| | Attr1 | Attr2 | Attr3 | Attr4 | ← Attribute name 605 |
| OR1 | 1 | 2 | c1 | t1 t2 | |
| OR2 | 2 | 1 | c1 | t2 | |
| OR3 | 10 | 9 | c2 | t4 t5 t6 | ← Example data set 601 |
| OR4 | 9 | 10 | c2 | t5 t6 | |

| Clustering algorithm | Generalized K-means, K = 2 |
|---|---|

← Selected algorithm and number of clusters 608

| Attr1 | Euclidean distance |
|---|---|
| Attr2 | Euclidean distance |
| Attr3 | K-L divergence |
| Attr | Negative cosine similarity |

← Attribute-type based distance metrics 610

| Attr1 | Variance |
|---|---|
| Attr2 | Variance |
| Attr3 | Entropy of mean probability distribution |
| Attr | 1 – mean (L2 norm) |

← Attribute-type based normalization factors 620

| | Cluster representative |
|---|---|
| Cluster1 | OR2 |
| Cluster2 | OR3 |

← Initial cluster model (for K=2 clusters) 630

*FIG. 6*

Normalized distance contributions (OR1 w.r.t. Cluster1) 702

| | Attr1 | Attr2 | Attr3 | Attr4 | Aggregate multi-attribute distance |
|---|---|---|---|---|---|
| OR1 | 0.06 | 0.06 | 0 | 4.18 | 0.06+0.06+0+4.18 = 4.30 |

Aggregate multi-attribute distance table 710

| | Cluster1 | Cluster2 |
|---|---|---|
| OR1 | 4.30 | Infinity (due to log(1/0) term) |
| OR2 | 0 | Infinity |
| OR3 | Infinity | 0 |
| OR4 | Infinity | 2.74 |

Next version of model 720 (based on means of cluster member attributes)

| | Cluster representative | | | | Cluster members |
|---|---|---|---|---|---|
| | Attr1 | Attr2 | Attr3 | Attr4 | |
| Cluster1 | 1.5 | 1.5 | (1.0)c1 | (0.5)t1 (1.0)t2 | OR1, OR2 |
| Cluster2 | 9.5 | 9.5 | (1.0)c2 | (0.5)t4 (1.0)t5 (1.0)t6 | OR3, OR4 |

FIG. 7

← 800 https://<website>.com/clusterModelRequest

Dear <customerName>,

Please enter information about the source of your data set ← 805
below, for which you would like a clustering model generated.
807

| Data source name | Data source type | URI/location | Optional record schema |
|---|---|---|---|
| <Enter a name for your data source here> | Streaming (default); click here to change | <Enter URL here> | <Enter schema specification here> |

By default, our clustering software will select the algorithms and
metrics used to classify observation records, the initial number ← 809
of clusters, an initial number of clustering iterations . If you
wish, you can override the default choices by clicking on the
links below. To learn more about the defaults, click here.

| | |
|---|---|
| Model name | <Username>-cm0004 (click here to change) |
| Clustering methodology | Generalized K-means (click here to change) |
| Number of clusters | 10 (click here to change) |
| Initialization algorithm | 5% sample-based K-means++ (click here to change) |
| Number of iterations before reporting results | 2 (click here to change) |
| Clustering quality metric | Normalized Dunn index (click here to change) |
| Distance metrics selection | Automated, attribute-type based (click here to change) |
| Normalization factors selection | Automated, attribute-type based (click here to change) |
| Convergence/termination criteria | Automated, relative convergence cost error-based (click here to change) |

← 811

813

[ Start model training ]

*FIG. 8* https://<website>.com/clusterCompareAndExplore

<modelName> cluster summary — 1005

| Cluster name (click name to explore details) | Cluster size (number or records, percent of total) | Normalized cost | Most discriminative attributes |
|---|---|---|---|
| Cluster001 (change) | 54365 (5.4%) | 66 | Attr-A, Attr-C |
| Cluster002 (change) | 46222 (4.6%) | 58 | Attr-B, Attr-C |
|  |  |  |  |
| Cluster010 (change) | 38765 (3.9%) | 42 | Attr-K, Attr-M |
| Total | 1000000 | - | - |

1007

<Cluster002> details

1008

|  | Attr-A | ... | Attr-P |
|---|---|---|---|
| Cluster representative value | <Attr-A-value> | ... | <Attr-P-value> |

1009

| Attribute name | Attribute type | Discriminative utility | Value details |
|---|---|---|---|
| Attr-A | Numeric (min 0.07, mean 0.09, max 0.12) | 0.93 (high) | 30% lower than average for all clusters |
| Attr-C | Text (511 distinct tokens) | 0.87 | 70% contain "www" |
| ... |  |  |  |

*FIG. 10*

SCALABLE CLUSTERING FOR MIXED MACHINE LEARNING DATA

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Clustering, or partitioning a set of observation records into multiple homogeneous groups or clusters based on similarities among the observations, is one of the more frequently used machine learning techniques. For example, at web-based retailing organizations, observation records associated with customer purchases or customers' web-page browsing behavior may be clustered to identify targets for customized sales promotions, advertising, recommendations of products likely to be of interest, and so on. Clustering may also be used as one of the steps in generating predictive machine learning models from raw observation records, e.g., to derive features with higher predictive utility than the raw observations, to reduce dimensionality, or simply to compress the raw data. Observation records may sometimes be clustered to help interested parties (e.g., managers or other decision makers at the organizations at which observation records are collected) gain additional insights into relationships among different segments of the data, e.g., to help decide as to how a given data set can best be utilized for business purposes.

Observation records of machine learning data sets may include values of a number of different types of attributes, such as numeric attributes, binary or Boolean attributes, categorical attributes and text attributes. The sizes of the data sets used for many machine learning applications, such as deep learning applications, can become quite large. Some machine learning data sets may include values for dozens or hundreds of attributes of different types, and a given data set may contain millions of observation records. For such data sets, it may not be straightforward to determine the relative importance of different attributes with respect to clustering. In general, clustering large data sets whose observation records include values for the different kinds of attributes may present a non-trivial challenge for several reasons—e.g., because of the level of statistical expertise which may be required, and/or because of the high requirements for resources such as computing power, memory, and storage.

BRIEF DESCRIPTION OF DRAWINGS

FIG. 6 illustrates example distance metrics, normalization factors and an initial version of a cluster model which may be identified for a trivial data set, according to at least some embodiments.

FIG. 7 illustrates a result of an iteration of applying the clustering methodology on the trivial data set illustrated in FIG. 6, according to at least some embodiments.

FIG. 8 illustrates an example programmatic interface which may be used by clients to request clustering of a data set at a machine learning service, according to at least some embodiments.

FIG. 10 illustrates an example programmatic interface which may be used to provide cluster summaries to clients of a machine learning service, according to at least some embodiments.

Figure 1:
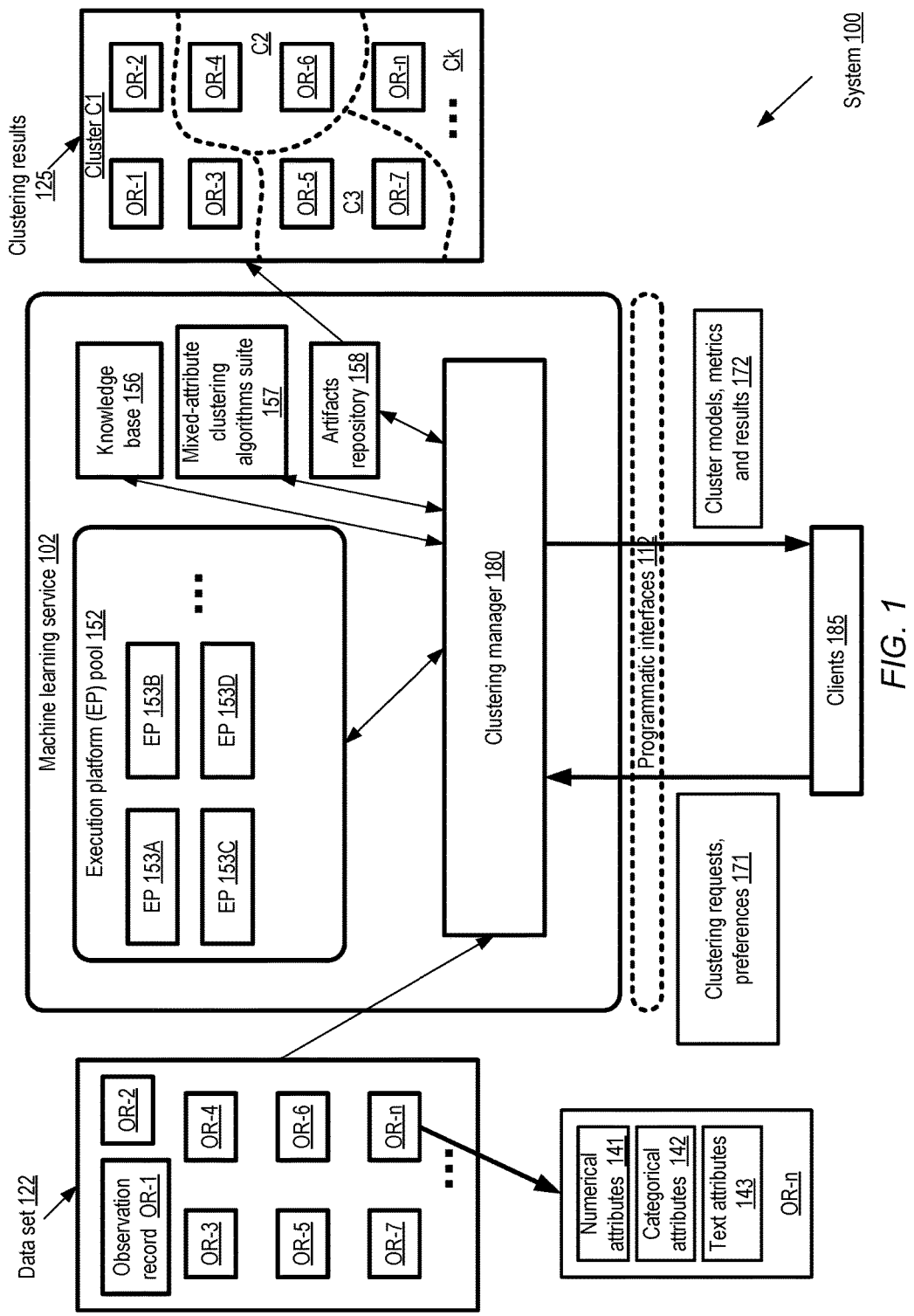
FIG. 1 illustrates an example system environment in which a scalable approach towards clustering large data sets with heterogeneous attributes may be implemented using resources of a network-accessible machine learning service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for scalable clustering of large machine learning data sets whose observation records comprise a mix of different attribute types (such as numerical, text or categorical attributes) are described. Such observation records may be referred to as heterogeneous, mixed-attribute, or mixed observation records herein, and the corresponding data sets may be referred to as heterogeneous, mixed-attribute or mixed data sets. In various embodiments, the techniques and algorithms described herein may be implemented at a network-accessible machine learning service of a provider network, and may not require expertise in statistics or machine learning on the part of the clients on whose behalf the techniques are implemented. For example, intelligent default choices may be selected at the machine learning service, e.g., based on a preliminary analysis of at least some observations of a data set, a schema associated with the data set and/or based on contents of a knowledge base, for a number of parameters of the clustering algorithms, including model initialization, distance computations and normalization techniques for different types of attributes, termination criteria and the like as described below. At the same time, mechanisms may be implemented to allow more knowledgeable clients to indicate preferences or requirements for various aspects of the clustering methodology, to change parameters based on interim results, and so on.

Generally speaking, networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance.

A machine learning service implemented at a provider network may have access to large numbers of execution platforms for implementation of the clustering algorithms and/or other machine learning algorithms, as well as to the resources of other services (such as storage or database services at which raw or processed data sets may be stored, or at which artifacts representing clustering models or model parameters may be stored). For different data set sizes, respective amounts of resources including execution platforms with the appropriate performance capabilities may be selected at the machine learning service. In some cases, different sets of resources may be utilized for respective iterations of the clustering algorithm, depending for example on the changing needs of the algorithm as convergence is neared, and/or depending on the available resources in the machine learning service's resource pools. For example, the group of execution platforms selected for a given iteration may be based on an estimate of a computation workload associated with that iteration, and/or on a current or recent utilization metric of the machine learning service's pool of execution platforms. Various security-related, data durability-related, and fault-tolerance-related techniques may also be implemented at the different services of the provider network, including the machine learning service, so that a variety of service level requirements of clients can be met. For example, because of the fault tolerance levels supported for the execution platforms of the machine learning service, the probability of losing the interim or final results of a clustering algorithm due to failures may be reduced. In some embodiments, clients may be able to indicate budget limits associated with clustering a given data set, and the service may automatically adjust parameters of the clustering algorithm accordingly. The machine learning service may also implement a number of easy-to-use programmatic interfaces in some embodiments, such as web-based consoles, application programming interfaces or APIs, command line tools, and/or graphical user interfaces, enabling clients to indicate source data sets for clustering requests, specify clustering-related preferences or requirements, view interim and/or final results of the clustering algorithms employed, and so on.

According to one embodiment, computing devices of the machine learning service may identify a data source from which the observation records of a given data set for which a clustering algorithm is to be implemented can be obtained. A number of different kinds of data sources may be supported in different embodiments, including pre-collected data stored at a provider network storage service, database service or a client's own storage resources, streaming data collectable from one or more network endpoints, result records generated by a different machine learning algorithm, and so on. The details of a given data source, such as a URL or storage device identifier or address, may be provided by a client via a programmatic interface in some embodiments as mentioned above. In some embodiments a client may provide a schema which indicates the data types and/or other characteristics (such as permitted value ranges, tokens which are to be considered indications of invalid or "not available" data, etc.) of different attributes of the observation records, while in other embodiments the machine learning service may identify the attribute types on its own. In various embodiments, the observation records of a data set may contain values for many different attribute types, including for example numerical, categorical, binary or Boolean, as well as text or text-like attribute types.

In various embodiments, the machine learning service may determine a clustering methodology to be applied to the data set, e.g., some generalized variant of a K-means algorithm, a K-medians algorithm, a K-harmonic-means algorithm, or a MeanShift algorithm may be selected. (The baseline K-means algorithm assumes that the observation records are real-valued vectors and employs squared Euclidean distance as distance measures. In contrast, a generalized version of the K-means algorithm may be employed using any non-negative distance measure that has a unique minimizer for the intra-cluster cost function. Similarly, generalized variants of other algorithms whose baseline versions are targeted towards single attribute types may be used in some embodiments.) Corresponding to the different attribute types, the machine learning service may identify respective distance metrics and/or relative weights to be assigned to different attributes. For example, in one embodiment, Euclidean distances may be used for numeric attributes, Kullback-Leibler or KL-divergence may be used for distances between categorical attributes, cosine-similarity-based measures may be used for distances with respect to text attributes, and so on. The per-attribute distance metrics may be used collectively, e.g., in conjunction with normalization factors selected by the machine learning service or specified by clients, to determine the aggregated or multi-attribute distance of a given observation record from respective cluster representatives of individual clusters in various iterations of the clustering methodology as described below. An initial version of the cluster model may be identified, e.g., indicating the respective cluster representatives of a selected number of clusters among which the observation records are to be distributed. The default number of clusters may be selected by the service in at least some embodiments.

One or more iterations of the clustering methodology may then be implemented. In a given iteration, the aggregate distance measures of the observation records may be computed with respect to the cluster representatives of the current version of the clustering model, and the observation records may be assigned to clusters of the current version of the model based on those distances. The cluster representatives for a new or updated version of the model may then be computed, e.g., based on the updates assignments of the observation records, and the updated version of the model may be used as the current version for the next iteration. The iterations may be performed until one or more termination criteria are met in various embodiments—for example, until the fraction or number of assignment changes made during an iteration falls below a threshold, or until a cost function evaluated for the clustering model reaches a threshold. In some embodiments, at the end of at least some iterations an estimate of a relative cost convergence error may be computed on the basis of one or more factors, such as the total number of iterations which have been performed, the fraction of observation records whose assignments changed during the most recent iteration, and/or a relative change in the cost function. The relative cost convergence error estimate, whose value may be based for example on empirical observations collected earlier of the correlations among the factors considered for the estimate and the measured rate of convergence of other instances of use of the clustering methodology, may be used in various embodiments to terminate the clustering iterations when the marginal benefits of additional iterations falls below a threshold. In some embodiments, other factors such as client budgets or measures of the clustering quality achieved thus far may also or instead be used as termination criteria.

After the iterations of the selected clustering methodology are concluded, in various embodiments, information indicating the most recent version of the model (e.g., the cluster representatives, and/or the assignments of different observation records to the clusters) may be stored in an artifact repository or database associated with the machine learning service. In at least one embodiment, various aspects of the results of the use of the clustering methodology may be indicated programmatically to clients of the machine learning service. For example, an overview or summary of the cluster definitions (e.g., the attribute values corresponding to the cluster representatives) may be provided, indications of the relative discriminative utilities of the different attributes (e.g., how useful or influential different attributes are with respect to classifying the observation records into clusters) may be provided, the populations of the different clusters may be indicated, and so on. In one embodiment the information may be provided in a layered manner, with interfaces enabling clients to obtain more details for various subsets of the results as desired. In some embodiments, clients may be provided interim results at various stages of the execution of the algorithm, e.g., indicating the current version of the model and some measure of the quality of the current version and the cost of additional iterations, so that the clients can decide whether additional iterations are to be implemented or not. In some embodiments, the set of execution platforms to be used for a given iteration may be selected dynamically at the start of each iteration, e.g., based on an estimate of the available resources of the machine learning service and/or based on the expected computing, memory or storage requirements of the next iteration.

At various stages of the clustering algorithm, the machine learning service may utilize a number of input sources to guide or determine subsequent actions in some embodiments. For example, contents of a knowledge base of the machine learning service may be examined to select or modify model parameters, client feedback or requests obtained via the programmatic interfaces may be analyzed, resource capacity measures provided by monitors associated with the machine learning service itself may be consulted to select execution platforms, billing amounts associated with the clustering algorithm may be considered, and so on. Using this flexible approach, a framework that enables efficient, scalable and customizable clustering of a wide variety of data sets may be supported in various embodiments.

Example System Environment

FIG. 1 illustrates an example system environment in which a scalable approach towards clustering large data sets with heterogeneous attributes may be implemented using resources of a network-accessible machine learning service, according to at least some embodiments. As shown, system 100 includes various resources associated with machine learning service 102, including execution platforms (EPs) 153 (e.g., EP 153A-153D) of an execution platform pool 152 used for computations required for various clustering and other machine learning algorithms, as well as a clustering manager 180 responsible for orchestrating the selection, parameterization and execution of clustering algorithms for observation records of various data sets. The clustering manager 180 may itself comprise software and/or hardware components a plurality of computing devices in some embodiments. The machine learning service 102 may be implemented at a provider network in some embodiments as mentioned earlier. In addition to the machine learning service 102, various other services may also be implemented using the resources of the provider network in the depicted embodiment. For example data sources for the data sets to be clustered (including source data set 122) may be stored at least temporarily at a storage service or a database service of the provider network in some embodiments.

In addition to the clustering manager 180, the machine learning service 102 may comprise a knowledge base 156, a library or suite 157 of mixed-attribute clustering algorithms, and/or an artifact repository 158 in the depicted embodiment. The knowledge base 156 may represent a growing collection of records representing insights gained during earlier instances of the use of various clustering approaches for a variety of data sets, and may be used to guide some of the decisions made by the clustering manager 180, e.g., in scenarios in which clients 185 allow the machine learning service to select parameters for clustering. A number of clustering algorithms may be included in suite 157, such as various variations of generalized K-means, K-medians, K-harmonic-means, MeanShift and the like, any of which may be applied to a given data set 122 based on selection by the clustering manager and/or based on client input. The artifacts repository 158 may be used to store interim and/or final results of the clustering methodologies being used, values of the parameters selected for the methodologies, and so on.

Clustering manager 180 may implement one or more programmatic interfaces 112 for interactions with clients 185 of the machine learning service in the depicted embodiment. The interfaces may include, for example, one or more web-based consoles or web pages, application programming interfaces (APIs), command-line tools, graphical user interfaces (GUIs) or the like. Using interfaces 112, clients 185 may, for example, submit clustering requests or preferences 171 and/or perform exploration of clustering results. The clustering manager 180 may provide indications of clustering models, metrics and/or results 172 (including for example intermediate results corresponding to various iterations of a selected clustering methodology or algorithm, or final results after the iterations have been completed) via the programmatic interfaces 112.

In one embodiment, a client 185 of the machine learning service may provide information (e.g., a network address, a database address, and/or a storage device address) regarding a data source from which observation records (ORs) of a data set 122 for which clustering is to be performed can be obtained by the clustering manager 180. Some or all of the observation records, such as OR-1 through OR-n of data set 122, may comprise a plurality of attributes of different types. For example, as shown, OR-n includes one or more numeric attributes 141, one or more categorical attributes 142, and one or more text attributes 143 in the depicted embodiment. Other types of attributes, including Boolean or binary attributes, attributes containing audio or image-based records, and the like, may also be included in a data set 122 in some embodiments. It is noted that with respect to the techniques and algorithms described herein, binary or Boolean attributes may be considered a subset of categorical attributes. In one embodiment, a client 185 may specify the schema of a data set 122—e.g., the types and formats of the different attributes, the sequence in which the attribute values appear in the observation records, constraints on allowed values of attributes, and so on may be specified via programmatic interfaces 112.

Based at least in part on the different kinds of attributes which form the observation records, the clustering manager 180 may determine various parameters and properties of the clustering methodology to be applied to data set 122 in the depicted embodiment. For example, the number of clusters into which the observation records are to be distributed, as well as a particular clustering algorithm such as generalized K-means, generalized K-medians, generalized K-harmonic-means, partitioning around medoids, or another similar approach may be selected. Corresponding to the clustering methodology, a cluster initialization technique (governing, for example, the initial cluster representatives of the selected number of clusters), respective distance metrics for different attributes of the observation records, weights to be assigned to the attributes when computing distances, and/or normalization techniques to be applied to the different attributes to arrive at an aggregated multi-attribute distance measure of an observation record from a cluster representative may be selected. In some cases, one or more of the parameters may be selected based at least in part on client requests or preferences, and/or based on contents of the knowledge base 156. Unlike in some approaches, attributes of several different types may be taken into account in the algorithms selected by clustering manager 180 in the depicted embodiment—that is, the distinctions and similarities considered when assigning observation records may be derived from not just numerical, categorical or text attributes alone, but from combinations of several or all of the attributes. In some cases in which clients 185 are aware of the relative significance (or expected relative significance from the client perspective) of different attributes of the observation records, the clients 185 may provide indications of the weights to be associated with one or more of the attributes. In various embodiments, some or all of the parameters may be selected without specific guidance from clients; in general, the extent of the client's participation with respect to the clustering methodology and parameter selection may depend on the client's preference. Some clients may simply indicate a source of the data set 122 and leave the modeling decisions to the clustering manager; other clients, who are more conversant with the statistics involved or who are experts in the subject matter or domain for which the observation records are collected, may provide more detailed guidance or preferences with regard to the modeling decisions.

After the model methodology parameters have been established, one or more clustering iterations may be performed in the depicted embodiment. A given iteration may involve two version of the cluster model (e.g., with each version comprising one collection of cluster representatives such as centroids in the case of K-means clustering) in various embodiments. In one embodiment, the aggregate or normalized multi-attribute-based distances of the various observation records from the cluster representatives of one version of the model may be computed and used to assign the observation records to the clusters of that version. A cost function associated with the current version of the model may also be computed in various embodiments. If termination criteria for the modeling methodology (which may be based at least in part on the cost function) are met, no additional iterations need be implemented, and the clustering results 125 (e.g., the current version of the model, and the assignments of the observation records to the set of clusters of the current version) may be stored in artifacts repository 158. If the termination criteria are not met, a modified or updated version of the model may be generated, in which new cluster representatives may be determined for at least some of the clusters based for example on the most recent set of assignments.

In at least some embodiments, instead of waiting until perfect convergence is achieved (i.e., until no improvements to the model cost function can be attained by re-assigning observation records to clusters), termination criteria that are based on the rate of convergence observed for other uses of the clustering methodology may be used. For example, the knowledge base 156 may indicate that, with respect to data sets 122 containing between ten million and one hundred million purchase-related observation records with a particular schema comprises a mix of N different attributes being analyzed for an e-retail web site, fifty iterations of generalized K-means algorithm usually result in achieving a clustering result which lies within p percent of the fully-converged result which can be obtained using the algorithm. Similar heuristics regarding how close the current results obtained may be with respect to the best possible results also be available, for example, based on the fraction of observation records whose cluster assignments changed during the most recent iteration, or the relative change in the cost function. A relative convergence cost error metric based at least partly on such empirical results of past clustering attempts may be estimated or calculated at the end of various iterations in one embodiment, and the decision that no additional iterations are required may be made by the clustering manager based on such estimated convergence error measures. In other embodiments, measures of clustering result quality (such as metrics based on variants of the Dunn index or normalized Dunn index) may be computed after each iteration, and further iterations may be abandoned if a targeted quality criterion has been met. In some embodiments, the quality measures achieved after J iterations (where J may be selected by the client) may be indicated to clients 185, and the clients may indicate whether additional iterations should be performed. In at least some embodiments, clients 185 (or the clustering manager 180) may modify some of the clustering methodology parameters after a particular iteration, e.g., if the results being achieved are found unsatisfactory or non-intuitive.

The programmatic interfaces 112 may be used to provide updated results (e.g., the definitions of cluster representatives of clusters C1-Ck in the results 125 of the current version of the cluster model) as they become available, on an ongoing or real-time basis, to clients 185 in some embodiments. The notification mechanisms to be used for providing cluster results, corresponding quality estimates, measures of accumulated resource usage or billing costs, and so on, may be selectable by the clients in some embodiments. In other embodiments, clients may only be notified after either a pre-determined termination criterion for the clustering has been met, or if resources designated for the clustering have been exhausted. In some embodiments, clients may use programmatic interfaces to indicate the clustering algorithms (for example, by providing code for algorithms) to be use on their behalf. In one embodiment, a pluggable general-purpose architecture may be used for implementing a number of clustering algorithms, in which the particular algorithm and corresponding parameters may be changed from one data set to another, while the clustering manager selects the particular execution platforms to be used for a given combination of a data set and clustering algorithm. In various embodiments, numerous instances of one or more clustering methodologies may be executed concurrently using different subsets of the execution platforms available in pool 152—e.g., one data set may be analyzed via a generalized K-means algorithm on behalf of one client using execution platforms EP 153A and EP 153B at the same time that another instance of the K-means algorithm is being applied to a different data set using EPs 153C and 153D. The set of computation resources, memory resources and/or storage resources being used for a given clustering data set 122 may change from one iteration to another in some embodiments, e.g., based on the estimated resource requirements of the iterations, the available capacity in resource pools such as 152, priorities indicated for the data set by clients 185, and so on. For example, particular execution platforms selected for a given iteration may be based on an estimate of a workload associated with the iteration, and/or on a utilization metric of the pool of execution platforms.

Iterative Mixed-Attribute Clustering Algorithm

Figure 2:
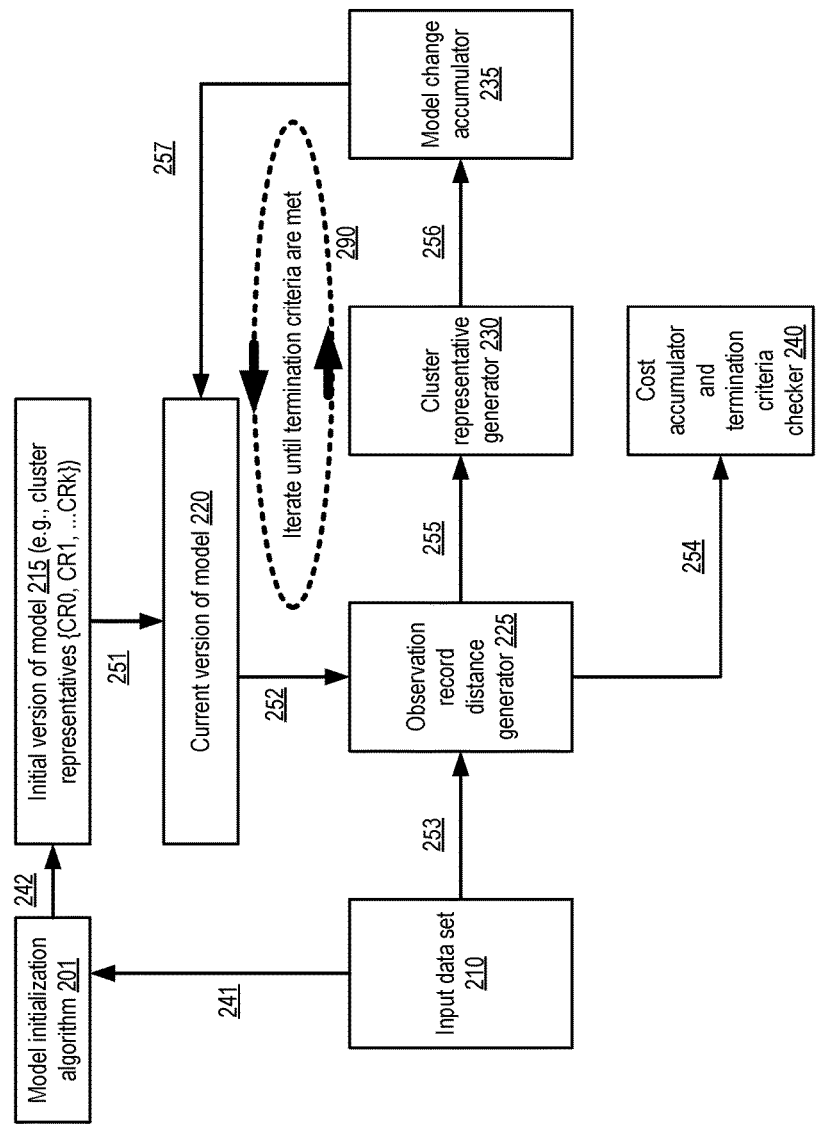
FIG. 2 illustrates a high-level overview of an iterative algorithm which may be employed for clustering large heterogeneous data sets at a machine learning service, according to at least some embodiments.

FIG. 2 illustrates a high-level overview of an iterative algorithm which may be employed for clustering large heterogeneous data sets at a machine learning service, according to at least some embodiments. A model initialization algorithm 201 may be applied to at least a portion of the source data set 210, as indicated by arrow 241. The initial version 215 of the cluster model, identifying the respective cluster representatives {CR0, CR1, . . . , CRk} of a selected target number of K clusters may be identified using the model initialization algorithm in the depicted embodiment, as indicated by arrow 242. The initialization algorithm 201 may be selected based on the particular clustering algorithm selected by the cluster manager in various embodiments: e.g., if a generalized K-means algorithm is being used, a corresponding K-means++ algorithm may be used for initialization. The quality of the results of a K-means-based clustering algorithm may depend strongly on the initial cluster representatives chosen. The K-means++ algorithm is intended to select the initial cluster representatives in such a way that the converged solution subsequently obtained using K-means is guaranteed to be close (e.g., within known error bounds proportional to the logarithm of K) to the optimal solution that could be found using K-means. In the K-means++ approach, the first cluster representative is chosen uniformly at random from the observation records, and each additional cluster representative is an observation record chosen from the remaining observation records with a probability proportional to the squared distance of that observation record from the closest representative. In one variant based on the K-means++ approach used in some embodiments and discussed in further detail with respect to FIG. 3 below, a sample of the data set 210 which is small enough to fit into a single execution platform's main memory may be used to identify the initial cluster representatives.

After the initial version of the model 215 has been identified, a number of iterations involving operations corresponding to loop 290 may be performed in the depicted embodiment. Distances of the observation record from the cluster representatives included in a current version of the model (set to initial version 215 for the very first iteration, as indicated by arrow 251) may computed by distance generator 225 (as indicated by arrows 252 and 253). Respective distance attributes for the different attribute types includes in the data set (e.g., Euclidean distance-based metrics for numeric attributes, K-L divergence-based metrics for categorical attributes or Boolean attributes, and/or cosine similarity-based metrics for text attributes) may be normalized and combined to arrive at an aggregate or attribute-type-independent distance measure in at least some embodiments. Such a distance measure may also be referred to as a multi-attribute distance metric. Cost accumulator and termination criterion checker 240 may utilize the aggregate distances computed (e.g., by comparing them with distance measures from the previous iteration) to determine whether additional iterations of the clustering procedure are to be executed, as indicated by arrow 254. If the termination criteria selected for the data set or methodology are not met, an updated or modified set of cluster representatives may be generated by cluster representative generator 230 using the newly-computed distances (as indicated by arrow 255). Model change accumulator 235 may combine the new cluster representatives with unchanged cluster representatives (if any) to derive the updated version of the model as indicated by arrow 256. The updated version of the model may be designated as the current version for the next iteration, as indicated by arrow 257.

In at least some embodiments a pluggable and/or extensible clustering framework may be implemented at the machine learning service, in which different sub-algorithms or modules for some or all of the entities represented by the blocks shown in FIG. 2 may be used for different client data sets. For example, the basic iterative workflow shown in FIG. 2 may be employed for a generalized K-means algorithm for one data set, a generalized K-medians algorithm for a different data set, and so on. The set of resources selected for each set of computations (e.g., for distance calculations, or for model change accumulation) may vary from one iteration to another in some embodiments, e.g., based on available machine learning service resources or based on the expected processing requirements of the iteration. For example, a different set of execution platforms may be selected for iteration J than is selected for iteration (J+1). Additional details regarding various aspects of the operations indicated in FIG. 2 are provided below, including the initialization of the cluster model, the computation of normalized multi-attribute distances, and the termination criteria checking.

Efficient Cluster Model Initialization

Figure 3:
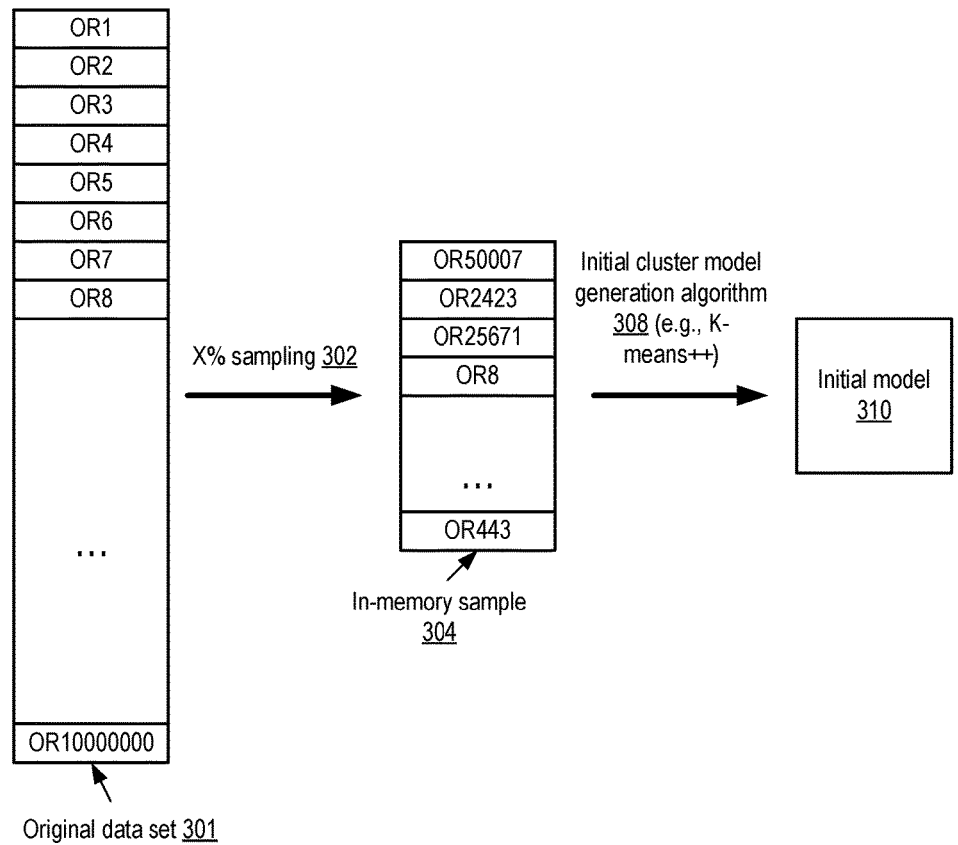
FIG. 3 illustrates an example of a sampling-based technique for cluster model initialization, according to at least some embodiments.

FIG. 3 illustrates an example of a sampling-based technique for cluster model initialization, according to at least some embodiments. In the depicted embodiment, original data set 301 comprises ten million observation records OR1-OR10000000. Some initialization techniques, such as an unmodified version of K-means++, may require examining all the observation records of the data set in K passes through the entire data set. When the data set comprises a large number of records, as in the case of data set 301, such a multi-pass technique may result in substantial I/O costs.

Instead of using the entire data set for initializing the cluster, an X % sample of the data set may be obtained in the depicted embodiment, resulting in an in-memory sampled subset 304. A chosen initial cluster generation algorithm (e.g., a generalized version of K-means++, in which distance metrics for multiple attribute types are normalized and aggregated) may then be performed on the in-memory sample 304, as indicated by arrow 308, to produce the initial version of the cluster model 310 in the depicted embodiment. This sampling-based approach may reduce I/O costs for initialization substantially without sacrificing the quality of the initial model and/or the final converged version of the model. Parameters such as the fraction of the original data set that is sampled, the particular sampling technique (e.g., reservoir sampling) to be used and/or the particular initialization technique used on the sampled subset may be chosen based at least in part on contents of the machine learning service's knowledge base in some embodiments.

Normalized Multi-Attribute Distance Computation

Figure 4:
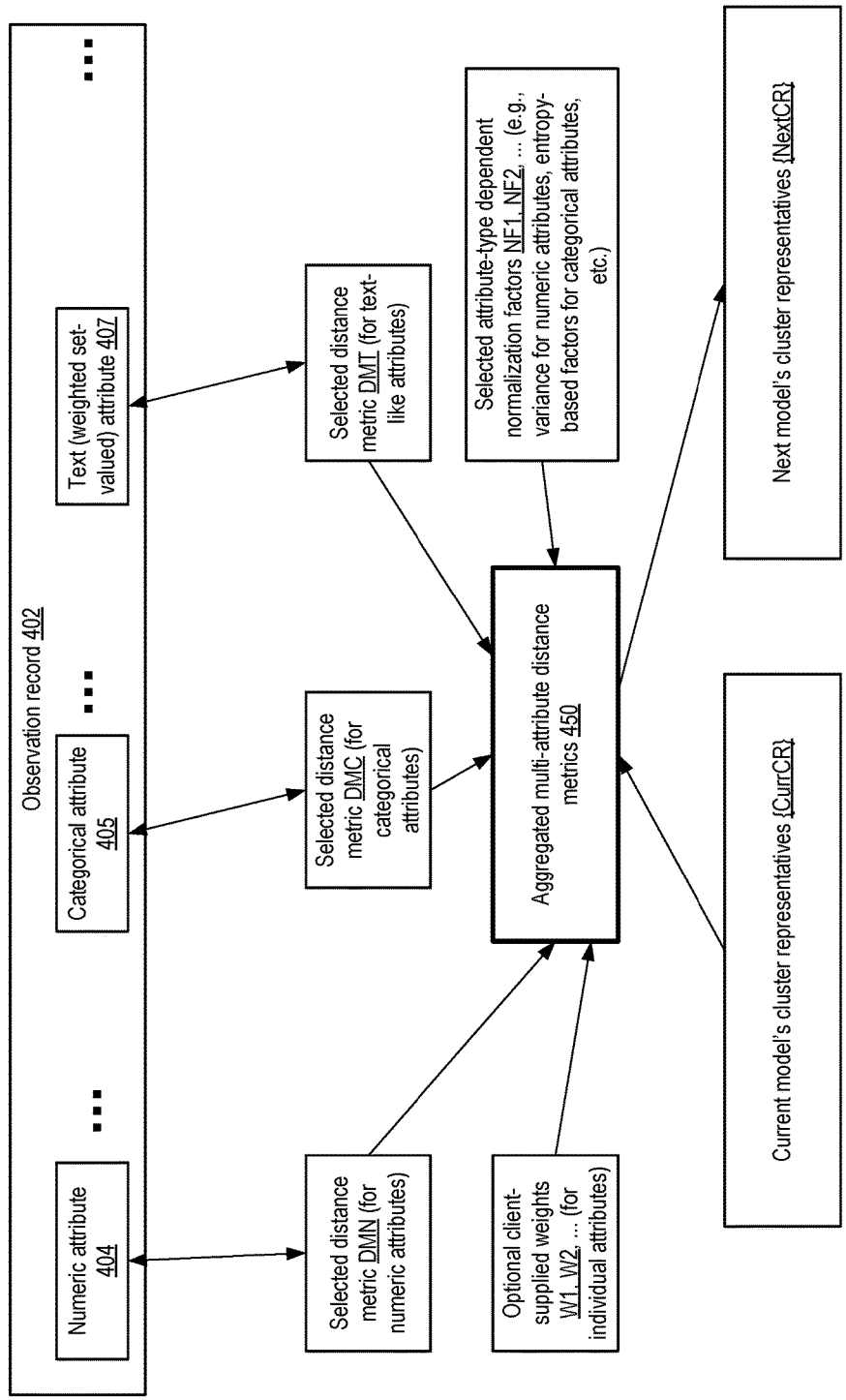
FIG. 4 illustrates an example normalization-based technique for determining distances between observation records and cluster representatives of a heterogeneous data set, according to at least some embodiments.

FIG. 4 illustrates an example normalization-based technique for determining distances between observation records and cluster representatives of a heterogeneous data set, according to at least some embodiments. A given observation record 402 of the input data set for clustering comprises one or more numeric attributes 404, one or more categorical attributes 405, and one or more text attributes 406. Text attributes may be considered one example of weighted set-valued attributes (e.g., attribute whose values may be viewed as respective weighted subsets of a possible token space, where each observed attribute value can be represented as a sparse high dimensional feature vector with dimensionality equal to the size of the token space).

Corresponding to each of the attributes of observation records 402, a respective distance metric may be selected based on the attribute type. For example, for numeric attribute 404, a distance metric DMN based on Euclidean distances may be chosen. DMC, the distance metric chosen for categorical attribute 405 may be based on K-L divergence measures, and DMT, the distance metric selected for text attribute 406 may be based on cosine similarity. In some embodiments, clients of the machine learning service may optionally indicate respective weights W1, W2, etc. corresponding to the individual attributes. The weights may represent the respective importance levels or significance of the different attributes with respect to cluster assignment, at least from the perspective of the clients. In various embodiments, the machine learning service may identify respective normalization factors NF1, NF2, . . . , etc., which may be applied to the attribute-specific distance metrics to, in one sense, provide a level playing field for inter-attribute-type comparisons. The normalization factors may also be dependent on the attribute types in some embodiments. For example, in the depicted embodiment, the variance of attribute values may be used as the normalization factor for numeric attributes, the entropy of the mean probability distribution may be used as the normalization factor for categorical attributes, and the norm of the average of unit vectors obtained after normalizing the text attribute values using the L2-norm may be used for text or weighted set-valued attributes. Using the raw attribute-type dependent measures, the client-supplied weights and/or the normalization factors, a common multi-attribute distance metric 450 may be computed for assignment of observation record 402 to a cluster. The multi-attribute distance 450 may incorporate statistical properties of all the different attribute types represented in the observation records, at least to some approximation, and may thus serve as better proxies for the similarities and differences between observation records than metrics based on a single attribute type. The aggregated multi-attribute distance metrics 450 of observation records such as 402 may be computed with respect to the current model version's cluster representatives {CurrCR}, and may be used to identify the cluster representatives {NextCR} of the next version of the model in an iterative procedure of the kind described in the context of FIG. 3 above.

Termination Criteria

Figure 5:
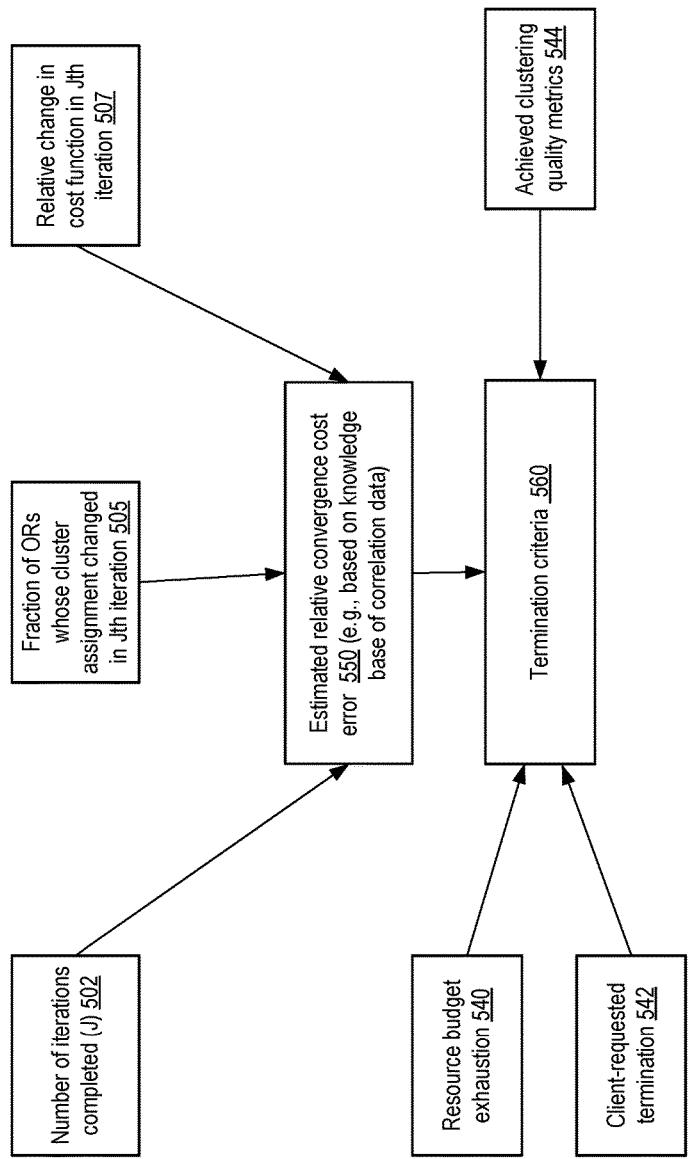
FIG. 5 illustrates examples of factors that may be taken into account to terminate an iterative algorithm for clustering heterogeneous data sets, according to at least some embodiments.

As described in the context of FIG. 3, many clustering algorithms may be iterative in nature, with new versions of the cluster model being generated in each iteration based on distances computed for the observation records from the cluster representatives of the previous model versions. FIG. 5 illustrates examples of factors that may be taken into account to terminate an iterative algorithm for clustering heterogeneous data sets, according to at least some embodiments.

In various clustering algorithms including those based on K-means, the initial iterations often result in a steep reduction in the cost function (i.e., a relatively rapid rate of convergence with respect to the best possible cluster assignments), with diminishing improvements achieved in the later iterations. In scenarios involving extremely large datasets, it may be very expensive (e.g., in computational or storage resources required) to continue the clustering iterations until perfect convergence is attained—that is, until no changes to cluster assignments result in any improvement in cost. In the depicted embodiment, an alternative approach involving the combination of several measures which may be collected for each iteration may be employed. As shown, an estimated relative convergence cost error metric 550 may be derived after at least some iterations from some combination of the total number of iterations 502 completed thus far, the fraction 505 of observation records whose cluster assignment changed in the most recent iteration, and/or the relative change 507 in the cost function in the most recent iteration. These factors may be chosen as contributors to the relative convergence cost error metric based on previous experience with clustering exercises or experiments, at least some of which may have been carried out to complete convergence. Statistics about such earlier exercises, including for example the correlations between factors 502, 505 and 507 and the ratio of the current cost to the final converged cost, may be stored in the machine learning service's knowledge base in some embodiments. Consider a scenario in which, for example, previous experience captured in the knowledge base indicates that for a different data set DS-old with similar size and complexity to the current data set DS-current, the cost reached to within 2% of the final converged value after J iterations, or after the fraction of reclassified observation records fell below P percent, or after the relative change of the cost function fell below C percent. Based on the captured relationships between the metrics 502, 505 and 507 and the relative cost with respect to the final converged cost for DS-old, the machine learning service may be able to estimate the relative error of the current cost for DS-current based in similar factors measured for DS-current. If the estimated error in relative convergence cost 550 falls below an acceptable threshold (e.g., a threshold selected by the machine learning service or by a client) after a given number of iterations, no more iterations may be performed in the depicted embodiment: that is, one termination criterion for the clustering algorithm may be defined in terms of the estimated relative convergence cost error metric 550.

In various embodiments, other factors, such as resource budget exhaustion 540 and/or client requests 552 to terminate the clustering may also play a role in determining when the algorithm is ended. For example, in some embodiments a client may indicate that no more than X seconds of CPU time is to be expended on clustering a given data set, or that no more than $Y in billing costs is to be consumed. In such scenarios the iterations may be terminated before a convergence cost-related target is met. In at least one embodiment, one or more measures of achieved clustering result quality 544 (e.g., based on a normalized Dunn index) may also be provided programmatically to clients after various iterations, and clients (or the machine learning service itself) may determine that additional iterations are no longer required after the quality metric reaches a threshold.

Parameters and Computations for Simple Example Data Set

FIG. 6 illustrates example distance metrics, normalization factors and an initial version of a cluster model which may be identified for a trivial data set, according to at least some embodiments. Data set 601 comprises four observation records OR1-OR4. As indicated in the attribute type row 603 and attribute names row 604, each observation record comprises two numeric attributes Attr1 and Attr2, one categorical attribute Attr3 and one text attribute Attr4. Example values for the different attributes for each observation record are shown in FIG. 6: e.g., in OR1, Attr1's value is 1, Attr2's value is 2, Attr3's value is c1, and the text attribute Attr4 comprises tokens t1 and t2.

Based for example on an initial analysis of the data set 601, the machine learning service has chosen generalized K-means using normalized multi-attribute distance measures as the clustering algorithm, and set the target number of clusters to 2 (element 608). With respect to each attribute, an attribute-type-dependent distance metric and an attribute-type-dependent normalization factor is selected, as shown in entries 610 and 620. For numeric attributes Attr1 and Attr2, the distance metric is Euclidean distance, and the variance is selected as the normalization factor. For categorical attribute Attr3, K-L divergence is chosen as the distance metric and entropy of the mean probability distribution is chosen as the normalization factor. For text attribute Attr4, negative cosine similarity is chosen as the distance metric, and the normalization factor is set to one minus the mean of the L2 norm. Based for example on random selection, OR2 and OR3 are chosen as the initial cluster representatives of the two targeted clusters, as indicated in initial cluster model 630.

FIG. 7 illustrates a result of an iteration of applying the clustering methodology on the trivial data set illustrated in FIG. 6, according to at least some embodiments. Example individual contributions of the four attribute values of OR1 to the aggregate multi-attribute distance are shown in table 702. For example, the variance-normalized Euclidean distances of Attr1 and Attr2 values of OR1 from the Attr1 and Attr2 values of OR2 (the cluster representatives) are 0.06 and 0.06 respectively. Since the Attr3 value of OR1 (c1) is the same as the Attr3 value of the cluster representative, the normalized distance with respect to Attr3 is zero. The distance of the text attribute Attr4 (whose value is "t1 t2" in OR1 and "t2" in the cluster representative) is computed as 4.12, so the aggregate multi-attribute distance is 4.3 (0.06+ 0.06+0+4.12) in the depicted example. It is noted that in different embodiments, different distance values than those shown in FIG. 7 may be obtained based for example on the selection of different metrics; the illustrated distance values are provided simply as examples.

The results of computing the multi-attribute distances for each observation record with respect to each cluster representative are shown in table 710. Some of the computations (e.g., entropy calculations involving the logarithm of I/O) result in divisions by zero, so the corresponding distance values are indicated as infinite. Based on the distances shown in table 710, OR1 and OR2 may be assigned to Cluster1, and OR3 and OR4 may be assigned to Cluster2 in the depicted example. Then (assuming that the termination criteria for the clustering exercise have not been met) new cluster representatives may be computed, e.g., based on the means of the attribute values of the cluster members. For example, with respect to Attr1, the mean of the values in OR1 and OR2 is ((1+2)/2)=1.5, so the new cluster representative for Cluster 1 has the value 1.5. Similarly, the values of the other numeric attributes of the new cluster representatives of the updated version of the model 730 may be computed as the arithmetic means of the corresponding observation records' numeric attribute values. The values for the categorical and text attributes of the cluster representatives may be indicated as probability distributions. For example, with respect to Attr4 in Cluster1's representative, a probability of 0.5 may be assigned to t1 (because t1 is present in OR1 but absent in OR2), while a probability of 1.0 may be assigned to t2 (because t2 is present in both OR1 and OR2). After the updated version of the model 730 has been generated, the process of computing normalized aggregate multi-attribute distances and re-updating the model (if necessary) may be repeated in subsequent iterations. It is noted that the trivial example shown in FIG. 6 and FIG. 7 is not intended to limit the kinds of parameters (e.g., the choice of the clustering algorithm, the initial model, the number of clusters, the distance metrics, and/or the normalization factors) that may be employed in various embodiments.

Programmatic Interfaces

As mentioned earlier, a number of different types of programmatic interfaces may be implemented by the clustering manager or other components of the machine learning service for client interactions in various embodiments. FIG. 8 illustrates an example programmatic interface which may be used by clients to request clustering of a data set at a machine learning service, according to at least some embodiments. The interface may include a web page 800 with an introductory message area 805, data source information section 807, parameter overview section 809 and parameter entry section 811, as well as a web control 813 to request initiation of training for a clustering model.

Introductory message area 805 may request the client to provide information about the source from which the observation records which are to be clustered can be obtained by the machine learning service. In the depicted embodiment, the details that the client may specify regarding the data source may include a data source name (e.g., any identifier of the client's choice, as long as the identifier is not already in use), a data source type (e.g., a streaming data source or a static pre-collected data source), the network address (e.g., indicated by a URL or uniform resource locator) or device name at which the data source is accessible, and/or a record schema for the observation records (e.g., the names, data types and/or sequence of the attributes). Schemas may be indicated in various formats in different embodiments—e.g., in XML (Extensible Markup Language) or a variant, in JSON (JavaScript Object Notation), in a data definition language similar to that used in SQL (Structured Query Language)-based databases, or in a custom schema description language implemented by the machine learning service.

In parameter overview section 809, the client may be informed that the machine learning service can select defaults for various parameters of the clustering exercise, such as the type of clustering algorithm, the number of clusters, etc., but that the client may override the defaults for various decisions if desired. As shown in region 811, the default choices made by the service may include, for example, some combination of an automatically-generated model name (based on the client's user name, for example), the clustering methodology (generalized K-means), the number of clusters (10), the initialization algorithm (K-means++ based on a 5% sample of the data set), the number of clustering iterations (2) to be completed before reporting interim results to the client, the clustering quality metric to be displayed in the results (normalized Dunn index), and the approaches to be used for distance selection (automated attribute-type based selection), distance normalization factors (automated attribute-type based selection), and algorithm termination (automated, relative cost convergence error-based).

In some implementations, some of the default parameter values may be selected after the machine learning service has performed a preliminary analysis (e.g., including checking the actual or estimated data set size and/or examining the schema) of at least a portion of the data set, so it may take some time after the client has indicated the data source details for the default entries of region 811 to be generated. In at least one embodiment, a client need not necessarily provide a schema, and the machine learning service may deduce the schema after examining some number of observation records. For some of the parameters, a drop-down list of supported or available options may be provided to the client if the client wishes to override the default settings selected by the service. After the client has made any desired changes (or if the client agrees with the default settings), control 813 may be used to start the clustering iterations to train the model in the depicted embodiment.

Figure 9:
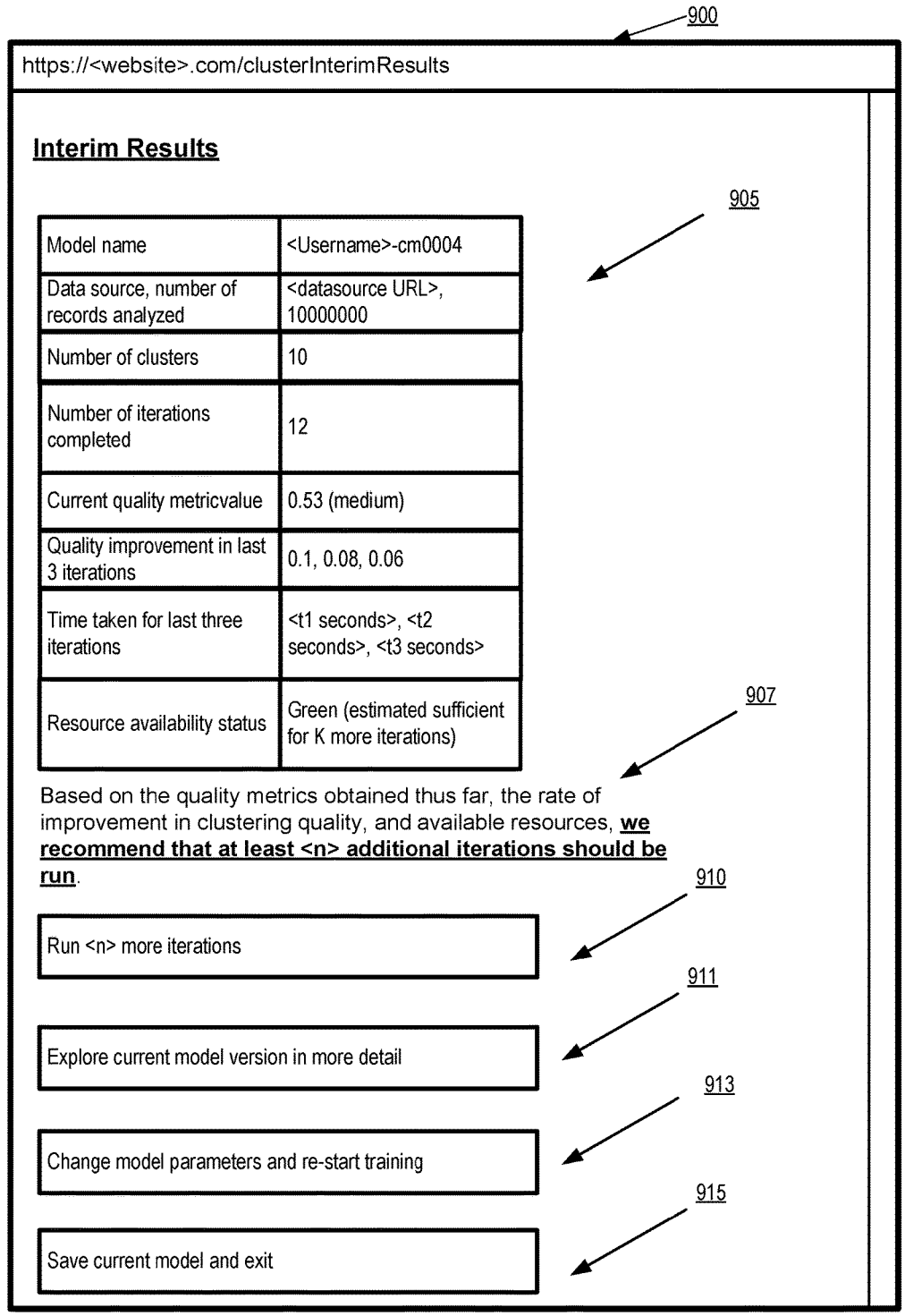
FIG. 9 illustrates an example programmatic interface which may be used to provide an indication of interim clustering results, according to at least some embodiments.

FIG. 9 illustrates an example programmatic interface which may be used to provide an indication of interim clustering results, according to at least some embodiments. As shown, the interface may include web page 900 comprising interim results table 905, a recommendation region 907, and web controls 910, 911 and 913 enabling the client to choose among various alternatives for further operations.

In the depicted embodiment, a new version of results table 905 may be generated after a specified number of iterations of the clustering algorithm have been run. The table may indicate, for example, the model name for which updated information is being provided, the data source from which observation records are gathered, the number of such records that have been examined, the number of clusters among which the observation records are being distributed, and the number of model training iterations that have been completed thus far. A current measure of the quality of the clustering (such as a metric similar to a Dunn index) may be displayed in the interim results table 905 in some embodiments, together with some indication of the rate of change of the quality (e.g., the quality improvements observed for each of several recent iterations). In some implementations, an indication of how much time recent iterations have taken may be provided as well, as in the entry labeled "Time taken for the last three iterations" in FIG. 9. In embodiments in which a maximum resource budget or limit has been set for the clustering algorithm, an indication of the remaining resources may be provided (e.g., in the "Resource availability status" entry of table 905). In the example scenario illustrated in FIG. 9, for example, the machine learning service has estimated that enough resources remain for K more iterations.

Based on the results achieved thus far and the trends observed regarding resource consumption versus resource availability, the machine learning service recommends that the client request at least an additional <n> iterations of the clustering algorithm in the depicted example, as indicated in recommendations region 907. The client may decide to act in accordance with the recommendations, and initiate the execution of <n> more iterations using web control 910. Alternatively, the client may explore the current version of the model in greater detail using control 911, or change one or more model parameters and restart the model training iterations with modified parameters using control 913. If the client is satisfied with the current state of the model, control 915 may be used to save the model and exit; that is, no additional iterations may be performed on the client's behalf if control 915 is used.

Some of the programmatic interfaces implemented by the machine learning service may enable clients to explore or view cluster summaries and/or additional details regarding various clusters in the current version of the model. FIG. 10 illustrates an example programmatic interface which may be used to provide cluster summaries to clients of a machine learning service, according to at least some embodiments. As shown, the interface may comprise a web page 1000 comprising table 1005 with high-level information about the clusters to which respective sets of observation records have been assigned, cluster representative listing 1008 and a cluster details table 1009. In table 1005, a respective row may provide per-cluster information such as the number of observation records assigned to each cluster, the percentage or fraction of the total number of observation records examined that have been assigned to the cluster, an indication of a cost function associated with the cluster (e.g., a mean normalized cost), and a list of the attributes whose values are most useful or significant in distinguishing the members of the cluster from the members of other clusters. Such attributes may be referred to as the most discriminative attributes with respect to the corresponding clusters. In the example illustrated in FIG. 10, Attr-A and Attr-C were the most discriminative attributes with respect to Cluster001, while Attr1-K and Attr-M were the most discriminative in the case of Cluster010.

By clicking on the link associated with a cluster's name, the client may be able to obtain additional details about the cluster population in the depicted embodiment. As indicated by arrow 1007, the client has clicked on Cluster002 in the scenario shown, and more information regarding attributes of observation records of Cluster002 is accordingly provided in cluster representative listing 1008 and table 1009. Cluster representative listing 1008 may provide the values for some or all of the representative's attributes (e.g., <Attr-A-value>, <Attr-P-value> etc.) in some embodiments. In at least one embodiment, information about the aggregate distances (which may have been computed using the selected attribute-type-dependent distance metrics and selected normalization factors) and/or the per-attribute distance metrics between various cluster representatives may also be provided via a portion of an interface similar to that shown in FIG. 10. In table 1009, a listing of all the attributes of the observation records may be provided, together with an indication of the corresponding value ranges (e.g., minimum, maximum, mean in the case of numeric attributes), the discriminative utility or discriminative power (i.e., the relative usefulness of the attribute with respect to assigning the observation records to clusters) as well as indications of the cluster-specific differences with respect to the overall mean value (for numeric attributes), or the number of different tokens and the most common tokens (for text attributes) may be provided. It is noted that in various embodiments, the kinds of information indicated in the web pages shown in FIGS. 8, 9, and 10 may also or instead be provided to clients via APIs, command-line tools, or non-web-based graphical user interfaces.

Methods for Scalable Clustering of Mixed Attribute Data

Figure 11:
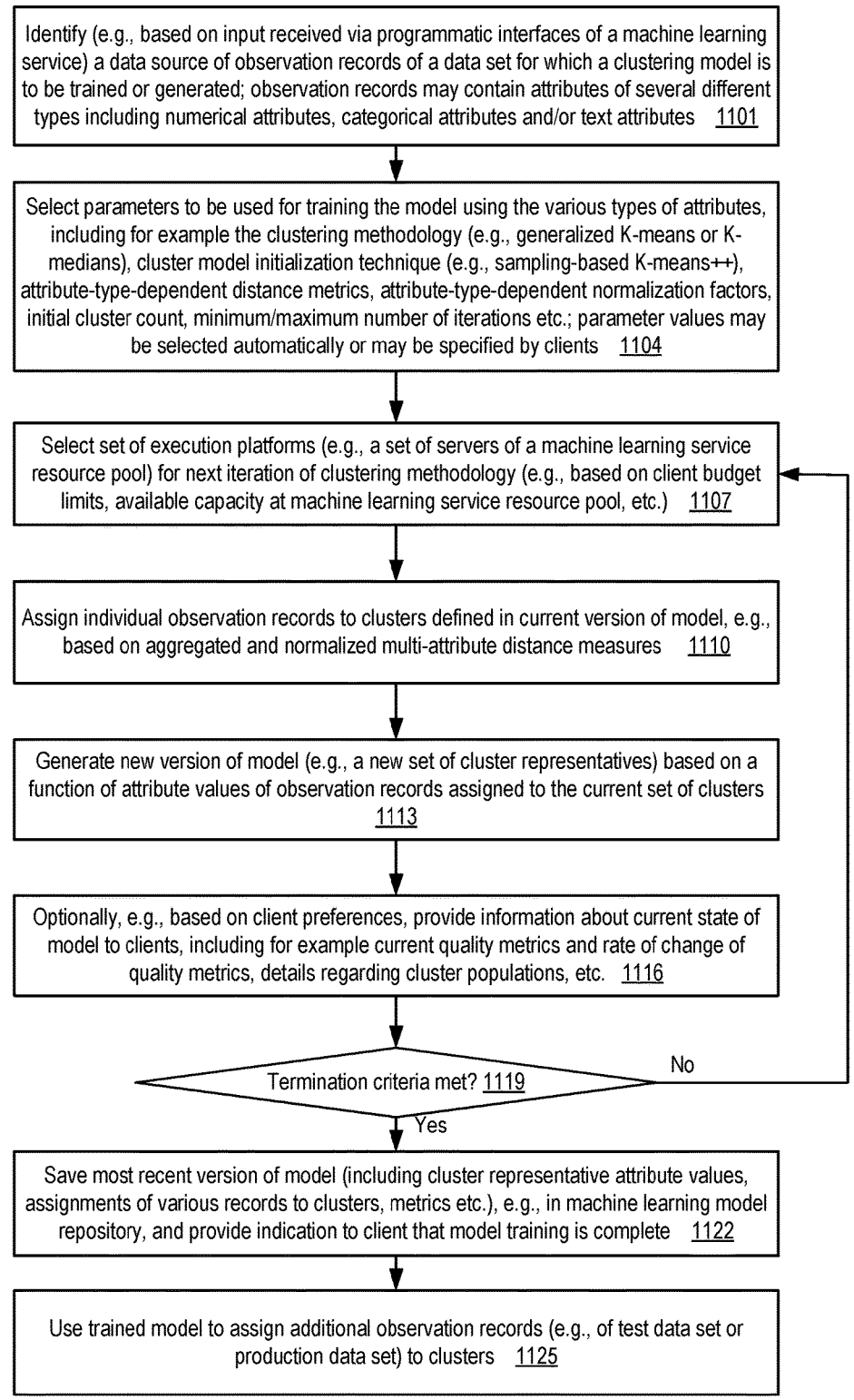
FIG. 11 illustrates aspects of operations that may be performed at a machine learning service to implement a scalable clustering algorithm for a heterogeneous data set, according to at least some embodiments.

FIG. 11 illustrates aspects of operations that may be performed at a machine learning service to implement a scalable clustering algorithm for a heterogeneous data set, according to at least some embodiments. As shown in element 1101, components of the machine learning service of a provider network, such as a clustering manager, may identify a data source from which mixed-attribute observation records of a data set which is to be distributed among clusters can be obtained. An observation record of the data set may include, for example, one or more numeric attributes, one or more categorical attributes, and/or one or more text attributes in some embodiments. A number of different types of data sources may be supported in various embodiments, including streaming data sources whose observation records are collected dynamically from one or more network endpoints, static data sets which have been collected in advance and stored at one or more storage devices (e.g., using a storage service or a database service of the provider network). In some embodiments, the service may obtain an indication of the data source from a client via one or more programmatic interfaces such as a web-based console or web page, a set of APIs, a command-line tool or a graphical user interface.

The clustering manager may select parameters to be used to train a clustering model of the data set (element 1104), e.g., without receiving explicit guidance or recommendations for the parameters from the client on whose behalf the clustering is to be implemented. For example, the clustering algorithm or methodology (e.g., a generalized version of the K-means algorithm which takes multiple attribute types into account, or a similarly generalized version of the K-medians algorithm), the cluster model initialization technique (e.g., an in-memory-sample based version of the K-means++ initialization technique), the number of clusters, respective distance metrics corresponding to the various attribute types represented in the observation records, normalization factors for combining the attribute-type-dependent distance metrics into a single aggregate multi-attribute distance metric, the minimum or maximum number of algorithm iterations, the termination criteria to be used to stop performing additional clustering iterations, and/or other parameters may be determined by the service. In at least some embodiments, clients may be provided an opportunity to modify some of the default choices made by the service—e.g., the default choices may be displayed via a web page which provides form fields or entry mechanisms allowing the client to override one or more of the default choices.

After the parameters have been identified, one or more iterations of the selected clustering algorithm may be implemented. The clustering manager may select the particular set of execution platforms to be used for the next iteration (element 1107) from a pool of execution platforms available at the machine learning service, e.g., based on the fraction of the pool's platforms that are free, the client's budget or resource constraints, and/or the expected computation requirements of the iteration. The set of execution platforms allocated may be scaled automatically in some embodiments, depending for example on the data set size, the relative progress made towards convergence, and so on. Within the iteration, the observation records may be assigned to clusters of the current version of the model based on computations of the aggregate multi-attribute distances of the records from the current version's cluster representatives (element 1110). The multi-attribute distances may be computed from the attribute-type-specific distances using the selected normalization factors in various embodiments. A new version of the clustering model (with at least one changed cluster representative) may be generated using some function of the attribute values of the observation records assigned to the clusters (element 1113). For example, with respect to a numeric attribute Attr1, a mean value of Attr1 may be computed across the observation records currently assigned to a given cluster ClusterJ, and the value of the cluster representative's Attr1 attribute in the new version of the model may be set to the computed mean.

Optionally, for example based on client preferences, information about the current state of the model (such as a Dunn index or similar quality indicator computed for the model, the rate of change of model quality over some number of previous iterations, etc.) may be indicated via programmatic interfaces of the clustering manager to a client (element 1116) at the end of some or all iterations. If the termination criteria for the model are met, as detected in element 1119, the current version of the model and the cluster assignments of the observation records may be stored at a persistent repository (element 1122), e.g., at an artifact repository of the machine learning service. The trained version of the model may later be used to assign additional observation records (e.g., of a test data set or a production data set) to clusters (element 1125). If the termination criteria are not met (as also detected in operations corresponding to element 1119), and resources for the clustering algorithm have not yet been exhausted, one or more additional iterations may be performed in the depicted embodiment—for example, the operations corresponding to elements 1107 onwards may be repeated.

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

Use Cases

The techniques described above, of utilizing resources of a machine learning service to implement scalable clustering algorithms on data sets with a mix of attribute types, may be useful in a variety of environments. Many problem domains being addressed using machine learning, including, for example, so-called deep learning applications, national security-related applications, and the like may require analysis and cluster assignment for millions of observation records, each of which in turn may include dozens or hundreds of attributes of several different attribute types. The clients on whose behalf the clustering is to be performed may not always be experts in machine learning or statistics, and it may not be straightforward for them to select the kinds of clustering algorithms and parameters to use. The machine learning service may include a knowledge base whose entries reflect prior experience with hundreds or thousands of similar data sets and clustering attempts, and it may therefore be possible for the service to select default parameters and algorithms which are likely to work well on any given new data set. For example, the service may select appropriate attribute-type-dependent distance metrics, and techniques to combine attribute-dependent distances into aggregated distance measures, without requiring guidance from clients. The implementation of easy-to-use interfaces that enable clients to examine the current state of the clustering effort, and make decisions as to whether resources should be deployed for additional iterations of the selected clustering algorithms, may allow different clients to gain insights into the cluster populations and inter-cluster differences, and to control their clustering-related costs.

Illustrative Computer System

Figure 12:
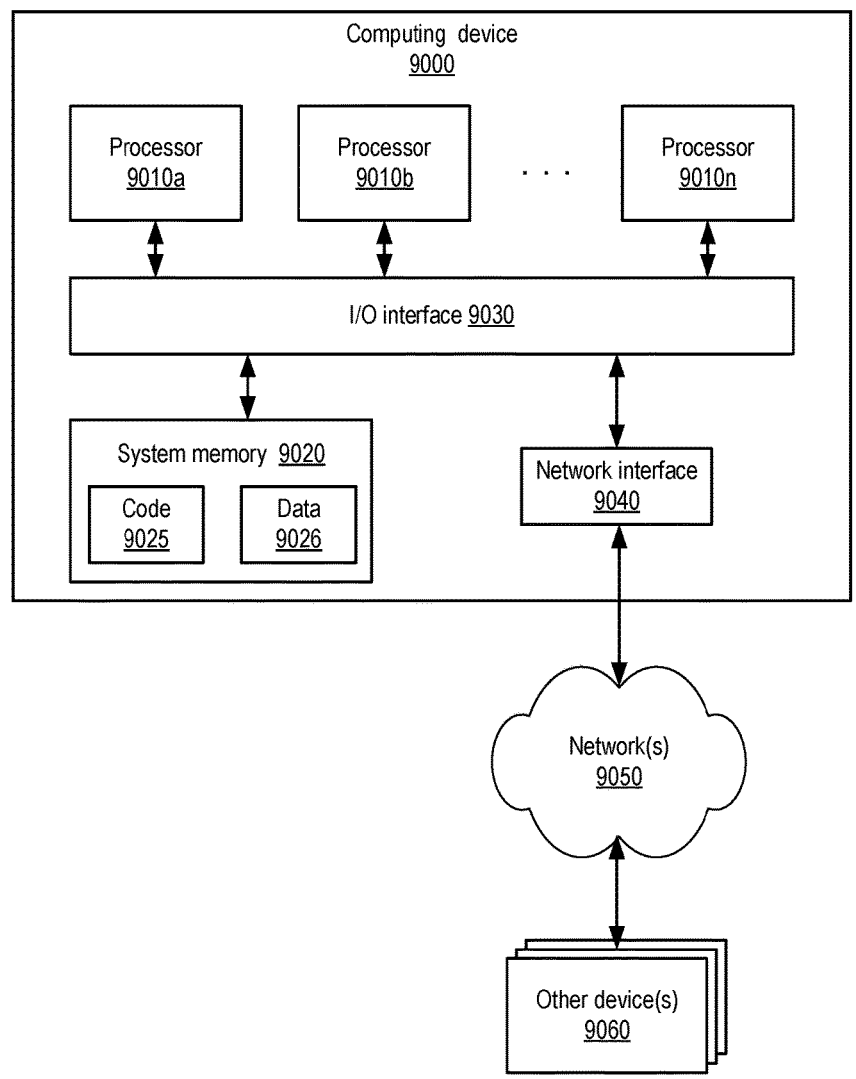
FIG. 12 is a block diagram illustrating an example computing device that may be used in at least some embodiments.

In at least some embodiments, a server that implements one or more of the techniques described above for generating cluster models for mixed-attribute data (including for example clustering managers, execution platforms and other components of a machine learning service) may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices of a machine learning service implemented at a provider network;
    wherein the one or more computing devices are configured to:
        identify a data source from which a plurality of observation records of a data set are to be obtained, wherein a particular observation record of the plurality of observation records comprises (a) a first attribute of a first attribute type of a set of attribute types, wherein members of the set include text attributes, numeric attributes and categorical attributes, and (b) a second attribute of a second attribute type of the set of attribute types;
        select a first distance metric associated with the first attribute type, and a second distance metric associated with the second attribute type, wherein the first and second distance metrics are to be used collectively to determine a multi-attribute distance of the particular observation record from a respective cluster representative of individual clusters of a plurality of clusters to which individual ones of the observation records of the data set are to be assigned using a particular clustering methodology;
        determine, using a subset of observation records of the data set, an initial version of a model of the data set, wherein the initial version of the model comprises a respective initial cluster representative associated with individual ones of the plurality of clusters, and wherein the subset of observation records excludes at least one observation record of the data set;
        perform one or more iterations of the particular clustering methodology, wherein an individual iteration of the plurality of iterations comprises:
            assigning, based at least in part on a respective multi-attribute distance of the particular observation record from individual cluster representatives of a particular version of the model of the data set, the particular observation record to a particular cluster of the plurality of clusters; and
            generating an updated version of the model of the data set, wherein said generating the other version comprises modifying at least one cluster representative included in the particular version of the model;
        in response to determining that a termination criterion of the particular clustering methodology has been met, store, with respect to one or more observation records of the data set, a respective indication of assignment of the observation record to a particular cluster of the plurality of clusters; and
        cause a user interface to display clustering results of the data set, wherein the user interface is configured to permit browsing of summary information of the individual clusters.

2. The system as recited in claim 1, wherein determining that the termination criterion has been met comprises one or more of: (a) receiving an indication via a programmatic interface from a client of the machine learning service, or (b) determining, after a particular iteration of the one or more iterations, a relative convergence cost error metric associated with the particular iteration.

3. The system as recited in claim 1, wherein the one or more computing devices are configured to:
    select, for a particular iteration of the one or more iterations, one or more execution platforms from a pool of execution platforms of the machine learning service, wherein the number of execution platforms selected is based at least in part on one or more of: (a) an estimate of a computation workload associated with the particular iteration, or (b) a utilization metric of the pool of execution platforms.

4. The system as recited in claim 1, wherein the particular clustering methodology comprises a use of a version of one or more of: (a) a K-means algorithm, (b) a K-medians algorithm, (c) a K-harmonic-means algorithm, or (d) a MeanShift algorithm.

5. The system as recited in claim 1, wherein the one or more computing devices are configured to:
    provide an indication, to a client via a programmatic interface, of (a) a first metric of discriminative utility associated with the first attribute, and (b) a second metric of discriminative utility associated with the second attribute.

6. A method, comprising:
    performing, by one or more computing devices:
        determining that a particular observation record of a data set includes a heterogeneous collection of attributes, including (a) a first attribute of a first attribute type of a set of attribute types and (b) a second attribute of a second attribute type of the set of attribute types, wherein the data set comprises a plurality of observation records including the particular observation record;
        selecting a first distance metric associated with the first attribute type, and a second distance metric associated with the second attribute type, wherein at least one distance metric of the first and second distance metrics is to be used to determine an aggregate distance of the particular observation record from a respective cluster representative of individual clusters of a plurality of clusters to which individual ones of the observation records of the data set are to be assigned using a particular clustering methodology;

performing, using one or more resources of a network-accessible machine learning service, one or more iterations of the particular clustering methodology, wherein an individual iteration of the plurality of iterations comprises:
- assigning, based at least in part on a respective aggregate distance of the particular observation record from cluster representatives of a particular version of a model of the data set, the particular observation record to a particular cluster of the plurality of clusters; and
- generating an updated version of the model of the data set, wherein said generating the updated version comprises modifying at least one cluster representative included in the particular version of the model;

in response to detecting that a termination criterion of the particular clustering methodology has been met, storing, with respect to one or more observation records of the data set, a respective indication of assignment of the observation record to a particular cluster of the plurality of clusters; and causing a user interface to display clustering results of the data set, wherein the user interface is configured to permit browsing of summary information of the individual clusters.

7. The method as recited in claim 6, wherein said detecting that the termination criterion has been met comprises determining, after a particular iteration of the plurality of iterations has been completed, that an estimate of a relative convergence cost error metric corresponding to the particular iteration has reached a threshold value.

8. The method as recited in claim 7, wherein the estimate of the relative convergence cost error metric is based at least in part on one or more of: (a) the total number of iterations which have been completed, (b) a fraction of observation records of the data set whose cluster assignment changed during the particular iteration, or (c) a relative change in a cost function computed during the particular iteration.

9. The method as recited in claim 6, further comprising performing, by the one or more computing devices:
selecting, for a particular iteration of the one or more iterations, one or more execution platforms from a pool of execution platforms of the machine learning service.

10. The method as recited in claim 6, wherein the particular clustering methodology comprises a use of one or more of: (a) a K-means algorithm, (b) a K-medians algorithm, (c) a K-harmonic-means algorithm, or (d) a Mean-Shift algorithm.

11. The method as recited in claim 6, wherein the observation records of the data set are assigned to clusters on behalf of a particular client of a clustering service, further comprising performing, by the one or more computing devices:
determining a number of clusters to be included in the plurality of clusters, without receiving an indication of the number of clusters from the particular client.

12. The method as recited in claim 6, further comprising performing, by the one or more computing devices:
assigning a first weight to the first attribute and a second weight to the second attribute; and
utilizing the first weight and the second weight to compute the aggregate distance of the particular observation record from a particular cluster representative corresponding to a particular cluster of the plurality of clusters.

13. The method as recited in claim 12, further comprising performing, by the one or more computing devices:
receiving an indication, from a client via a programmatic interface, of the first weight.

14. The method as recited in claim 6, further comprising performing, by the one or more computing devices:
providing an indication, to a client via a programmatic interface, of one or more of (a) respective values of one or more attributes of a cluster representative of a first cluster of the plurality of clusters, (b) an indication of an aggregate distance between the cluster representative of the first cluster and a cluster representative of a different cluster of the plurality of clusters, (c) a number of observation records assigned to the first cluster, or (d) an indication of a range of values of the first attribute corresponding to the first cluster.

15. The method as recited in claim 6, wherein the set of attribute types comprises text attributes, categorical attributes and numeric attributes, wherein a distance metric selected for a text attribute comprises a negative cosine similarity metric, a distance metric selected for a numeric attribute comprises a Euclidean distance metric, and wherein a distance metric selected for a categorical attribute comprises a KL (Kullback-Leibler) divergence metric.

16. A non-transitory computer-accessible storage medium storing program instructions that when executed on one or more processors:
determine a plurality of attributes to be used to identify a plurality of clusters of observation records of a data set, wherein the plurality of attributes includes (a) a first attribute of a first attribute type and (b) a second attribute of a second attribute type;
select a first distance metric associated with the first attribute type, and a second distance metric associated with the second attribute type, wherein at least one distance metric of the first and second distance metrics is to be used to determine an aggregate distance of a particular observation record of the data set from a respective cluster representative of individual clusters of the plurality of clusters;
perform, using one or more resources of a network-accessible machine learning service, one or more iterations of a selected clustering methodology until a termination criterion has been met, wherein an individual iteration of the plurality of iterations comprises:
- assigning, based at least in part on a respective aggregate distance of the particular observation record from cluster representatives of a particular version of a model of the data set, the particular observation record to a particular cluster of the plurality of clusters; and
- generating an updated version of the model of the data set, wherein said generating the updated version comprises modifying at least one cluster representative included in the particular version of the model; and cause a user interface to display clustering results of the data set, wherein the user interface is configured to permit browsing of summary information of the individual clusters.

17. The non-transitory computer-accessible storage medium as recited in claim 16, wherein the instructions when executed on one or more processors:
indicate, to a client via a programmatic interface after a particular iteration of the plurality of iterations has been completed, one or more of (a) a clustering quality metric associated with a result of the particular iteration or (b) a recommendation to initiate one or more iterations of the plurality of iterations.

18. The non-transitory computer-accessible storage medium as recited in claim 16, wherein the instructions when executed on one or more processors:
   determine, based at least in part on a knowledge base of the machine learning service, an initial version of a model of the data set, wherein the initial version of the model comprises a respective initial cluster representative associated with individual ones of the plurality of clusters.

19. The non-transitory computer-accessible storage medium as recited in claim 16, wherein the instructions when executed on one or more processors:
   select, for a particular iteration of the one or more iterations, a first set of one or more execution platforms from a pool of execution platforms of the machine learning service; and
   select, for a different iteration of the one or more iterations, based at least in part on an indication of a utilization level of the pool, a different set of one or more execution platforms from the pool of execution platforms of the machine learning service.

20. The non-transitory computer-accessible storage medium as recited in claim 16, wherein the instructions when executed on one or more processors:
   select a first normalization factor associated with the first attribute type, and a second normalization factor associated with the second attribute type; and
   determine, using at least the first normalization factor and the second normalization factor, an aggregate distance between the particular observation record and a cluster representative of a particular cluster of the plurality of clusters in a particular iteration of the plurality of iterations.

* * * * *